3,554,915
CLEANSING AND SANITIZING COMPOSITIONS
Robert E. Keay, Hightstown, N.J., and Russell R. Keast, Yardley, Pa., assignors to FMC Corporation, New York, N.Y., a corporation of Delaware
No Drawing. Filed Nov. 19, 1968, Ser. No. 777,163
Int. Cl. C11d 7/56
U.S. Cl. 252—99     4 Claims

ABSTRACT OF THE DISCLOSURE

Cleansing and sanitizing compositions are provided which are effective in cleansing and sanitizing utensils used for serving foods and beverages to humans. The compositions comprise a chlorinated isocyanurate, a polyphosphate, a urea compound, sodium bisulfate, sodium tetraborate and a nonionic or anionic surfactant. Where the surfactant is anionic, these compositions are particularly effective in cleansing and sanitizing bar glasses without an after-rinse.

BACKGROUND OF THE INVENTION

Glasses, cups, dishes, cutlery and the like utensils used in serving beverages and foods for human consumption must be cleansed and sanitized carefully between uses. This is particularly so in the case of utensils used in serving the public, where both laws and public acceptance regulate the effectiveness of the cleansing and sanitizing means, although the same basic requirements of cleanliness and health protection exist in the home. In addition, an increasing number of state and local ordinances specify that sanitizing compositions when used in commercial establishments must be effective without an after-rinse. They therefore must be capable of cleaning and sanitizing utensils effectively, while being capable of draining from them without leaving an undesirable residue on the sanitized utensil.

Compositions heretofore used in cleansing utensils used for serving foods generally have incorporated an available chlorine releasing agent, for example a chlorinated isocyanurate, trichloro melamine, a hypochlorite or the like. Such compositions of the prior art have been useful, but have tended to be deficient in one or more of several characteristics. These include chlorine stability, both in solution and in the dry condition, the ability to provide a cleansed, residue-free utensil without an after-rinse with clean water, germicidal activity, and freedom from a characteristic and objectionable chlorine odor on sanitized utensils and in the cleansing and sanitizing solution.

In the case of glasses used to serve beer, commonly referred to as bar glasses, prior compositions have had the additional disadvantage that either they have affected the head and the taste of beer served in glasses cleansed and sanitized with them or they have been ineffective sanitizers when used at ambient temperatures and in a simple dipping procedure. This has been a particularly aggravated problem in view of the large number of such glasses used and the careful regulations imposed by regulatory agencies on restaurants and other places which serve alcoholic beverages.

SUMMARY OF THE INVENTION

We have now found that utensils used to serve foods and beverages to humans can be cleansed and sanitized very effectively with new compositions which do not have the above-enumerated deficiencies. Our new compositions contain as essential ingredients about 20 to 50%, and preferably 25 to 35%, by weight of an alkali metal polyphosphate, preferably sodium tripolyphosphate, potassium tripolyphosphate, sodium pyrophosphate or potassium pyrophosphate, about 20 to 40%, and preferably 25 to 35%, by weight of sodium tetraborate having an $Na_2O$ to $B_2O_3$ ratio of about 1:2.25 and having 1 to 5 moles of water of hydration, about 20 to 40%, and preferably 25 to 35%, by weight of an alkali metal bisulfate, preferably sodium bisulfate, about 4 to 6%, and preferably 5%, by weight of a chloroisocyanurate which may be sodium dichloroisocyanurate, potassium dichloroisocyanurate, a complex of potassium dichloroisocyanurate and trichloroisocyanuric acid or any other chloroisocyanurate, a urea compound such as urea, 1,3-dimethyl urea or other water-soluble N-lower alkyl urea derivative in an amount to provide NH to $Cl^+$ ratio of about 1:1 in a cleansing and sanitizing bath (generally speaking an amount of about 0.5 to 3% by weight) and about 0.10 to 2% by weight of an anionic or nonionic surfactant.

In a particularly preferred embodiment of our invention the surfactant is an anionic surfactant, and the compositions are highly effective in cleansing and sanitizing bar glasses by a simple dipping procedure at ambient temperatures, and without an after-rinse.

Our compositions have the advantage that they are effective at room temperature without sacrifice of cleansing or sanitizing ability. Furthermore, when used in the amounts indicated above our storage-stable compositions provide effective sanitizing, a high degree of solution stability, the ability to drain freely from the treated ware without leaving streaks or films even when not followed by an after-rinse with clean water, and freedom from chlorine odor in the bath and on the sanitized utensil.

DESCRIPTION OF THE INVENTION AND THE PREFERRED EMBODIMENTS

The alkali metal polyphosphates are employed in our compositions as builders which enhance their detergency and cleansing effect. They are generally employed in the amount of 20 to 50%, and preferably 25 to 35%, by weight of the composition, although slightly more or less of this ingredient may be utilized without serious disadvantage. Useful polyphosphates include the sodium and potassium tripolyphosphates and the sodium and potassium pyrophosphates, as well as other alkali metal polyphosphate detergent builders.

The sodium tetraborate employed in our compositions is a material having an $Na_2O$ to $B_2O_3$ ratio of about 1:2.25, and which contains 1 to 5 moles of hydrated water. It is employed in the amount of about 20 to 40%, and preferably 25 to 35%, by weight of the composition. The tetraborate, in cooperation with the other ingredients of our composition, is effective in improving rinsability or draining.

The bisulfate employed in our compositions may be any alkali metal bisulfate, preferably sodium bisulfate or potassium bisulfate. These materials provide pH control in the composition, and generally are employed in the amount of 20 to 40%, and preferably 25 to 35%, by weight of the composition. The bisulfate is particularly important in that our compositions, which employ a urea compound together with a chlorine compound, require an essentially neutral pH (between about 6.0 and 7.5) for good chlorine solution stability.

The chloroisocyanurate is included in our compositions as a source of available chlorine, which should be present in the amount of about 100 parts per million (p.p.m.) in the sanitizer bath for germicidal effectiveness. Obviously it is possible to depart from this available chlorine level to a reasonable extent, and still achieve good sanitization, and in this connection often the bath is prepared with 120 p.p.m. of available chlorine initially so that even upon some usage of this ingredient the bath will contain 100 p.p.m. of this agent. However, in the event too little available chlorine is employed, insufficient sanitizing occurs, while if too much available chlorine is present, chlorine odor may become a problem both in the bath and in the rinsed product. The chloroisocyanurate, when employed in the amount of 4–6%, and preferably 5%, by weight in our compositions provides the desired amount of available chlorine in the sanitizer bath.

Useful chloroisocyanurates include the sodium and potassium dichloroisocyanurates as well as complexes of potassium dichloroisocyanurate and trichloroisocyanuric acid. The preferred complex is that which is composed of 4 moles of the potassium salt and 1 mole of the trichloroisocyanuric acid. The chloroisocyanurates generally may be used, provided they are stable and sufficiently soluble in water to dissolve at the levels used.

The water-soluble urea compounds, particularly urea, 1,3-dimethyl urea or other water-soluble N-lower alkyl urea derivatives, are employed in sufficient quantity to provide an NH to Cl+ ratio in the sanitizer bath of on the order of about 1:1. The alkyl groups in the N-lower alkyl urea derivatives have 1 to 4 carbon atoms, and 1 to 3 such groups may be on the molecule. When urea is used, an amount of about 0.5 to 3%, and preferably 0.6 to 0.8%, by weight is employed and when 1,3-dimethyl urea is used, about 1.5 to 3.0%, and preferably, 2.0 to 2.2%, by weight is employed. Obviously the amount of this ingredient will vary depending on the amount of chloroisocyanurate present, and thus the amount required to provide the desired NH to Cl+ ratio of about 1:1. The urea compound functions in cooperation with the other ingredients of our composition to limit the undesirable effects of chlorine such as chlorine odor, chlorine taste and decomposition and loss of chlorine.

A low-foaming anionic or nonionic surfactant is employed in our composition in the amount of 0.10 to 2%, by weight. Preferably 0.2% by weight is used in the case of the anionic surfactant, while 1% by weight is preferred when the nonionic surfactant is employed.

Anionic surface active agents useful herein are non-soap sythetic detergents, including those which are made up of water-soluble salts and organic sulfuric reaction products having from about 8 to 18 carbon atoms in the form of an alkyl radical within the molecular structure and containing sulfuric or sulfonic acid ester radicals. Typical examples of these anionic surface active agents are sodium or potassium alkyl benzene sulfonates in which the alkyl group contains from about 8 to 18 carbon atoms, e.g., sodium dodecyl benzene sulfonate and sodium tridecyl benzene sulfonate; the sodium and potassium alkyl glycerol ether sulfonates, including esters of high fatty alcohols derived from the reduction of coconut oils; the reaction products of higher fatty acids, e.g. coconut oil with sodium or potassium isethionate; sodium or potassium alkyl sulfonates and sulfates obtained by sulfonation of coconut or tallow fatty alcohols and mixtures of such alkyl sulfates; dialkyl esters of sodium or potassium salts of sulfosuccinic acid; sodium and potassium salts of sulfated or sulfonated monoglycerides, e.g., those derived from coconut oil; sodium or potassium salts of higher fatty alcohol esters of sulfocarboxylic acids, e.g., sodium salt of lauryl alcohol ester of sulfoacetic acid; and other anionic agents set forth in U.S. Pat. 2,486,921 issued to Byerly on Nov. 1, 1949. If desired, the anionic surfactant can be added in the form of a dense, dry bead or as a flake admixed with sodium sulfate.

Examples of other useful anionic non-soap synthetic detergents are acyl sarcosinates, e.g., sodium N-lauroyl sarcosinate. The sodium alkyl benzene sulfonates in which the alkyl group contains about 9 to about 15 carbon atoms are preferred in the practice of this invention.

Nonionic surface active agents useful in the present invention are non-soap synthetic detergents including those made up of a water-solubilizing polyoxyethylene group in chemical combination with an organic hydrophobic compound. Among the hydrophobic compounds which can be used are polyoxypropylene, the reaction product of propylene oxide and ethylene diamine, aliphatic alcohols, etc. Examples of nonionic synthetic detergents useful in the present invention are, condensation products of 6 to 30 moles of ethylene oxide, and preferably 7 to 11 moles, with 1 mole of an alkyl phenol containing 6 to 12 carbon atoms in the alkyl group; condensation products of 6 to 30 moles of ethylene oxide with 1 mole of an aliphatic straight or branched chain alcohol containing 8 to 18 carbon atoms; condensation product of ethylene oxide and the reaction product of propylene oxide and ethylene diamine; nonyl phenol polyethoxy ethanol (commercially known as "Triton N" series); isooctyl phenol polyethoxy ethanol (commercially known as "Triton X" series).

Another well known group of nonionic detergents is known under the trade name of the "Pluronic" series. These compounds are the reaction products obtained by condensing ethylene oxide with a hydrophobic base produced by the condensation of propylene oxide with propylene glycol, and having molecular weights on the order of about 1800. The addition of polyoxyethylene radicals to the hydrophobic base increases the water solubility of the nonionic detergent and concurrently increases the foaming properties of the detergent in aqueous solution in proportion to the mole ratio of polyoxyethylene radicals to the hydrophobic base. In general, a surfactant which has a mole ratio of 7.5 moles of ethylene oxide per mole of an alkyl phenol, e.g., nonyl phenol, is low-foaming while one with a mole ratio of 10:1 foams moderately. The molecular weight of these nonionic synthetic detergents will range from as low as 800 up to about 11,000.

Nonionic surfactants which meet these requirements also include the low alkyl ethers of polyoxyethylated octylphenols such as those sold under the Triton CF trade name, for examples "Triton CF-54" which is the butyl ether of polyoxyethylated octylphenol; an alkyl ether of polyoxyethylated alkanol such as "Surfactant DF-12," polyoxyalkylene glycols having a plurality of alternating hydrophobic and hydrophilic polyoxyalkylene chains, the hydrophilic chains consisting of linked oxyethylene radicals and the hydrophobic chains consisting of linked oxypropylene radicals, said product having three hydrophobic cahins linked by two hydrophilic chains, the central hydrophobic chain constituting 30% to 34% by weight of the product, the terminal hydrophobic chains together constituting 31% to 39% by weight of the product, the linking hydrophilic chains together constituting 31% to 35% by weight of the product, the intrinsic viscosity of the product being from about 0.06 to 0.09 and the molecular weight of the product being from about 3000 to 5000, all as described in U.S. Pat. 3,048,548; the alkyl polyoxyalkylene ether alcohols based on straight chain biodegradable hydrophobic segments, for example "Tretolite H-0307-S" and, the water soluble benzyl ether of octylphenol condensed with ethylene oxide. Other nonionic surfactants are suitable for use in the herein preparations and it is not intended to exclude any surfactant possessing the above properties.

The nonionic surfactants particularly useful in the herein compositions are the nonionic surfactants resistant to the action of available chlorine, especially those having the following formula:

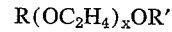

$$R(OC_2H_4)_xOR'$$

in which R is an alkaryl group in which the alkyl group has 6 to 13 carbon atoms or an alkyl group having 8 to 18 carbon atoms, $x$ is 10 to 18, and R' is an alkyl, aryl, alkaryl or aralkyl group having 3 to 12 carbon atoms. The preferred agents are those in which R is an alkyl phenylene group in which the alkyl group has 8 to 9 carbon atoms, $x$ is 10 to 18 and R' is an alkyl group having 3 to 7 carbon atoms or is a benzyl group.

The compositions of our invention generally are used in the amount of about ¼ to 1 ounces per gallon (0.00187 to 0.00750 g./cc.) of water, and preferably ½ ounce per gallon (0.00375 g./cc.) of water, and when so used provide a sanitizing bath containing on the order of 100 to 120 parts per million of available chlorine. Obviously greater or lesser amounts can be used, provided the proper chlorine to stabilizer balance is maintained.

Our compositions are useful in cleansing and sanitizing utensils by ordinary hand-washing techniques, in which the utensil is simply washed in an aqueous solution of the material and dried by standing at room or elevated temperature, or by wiping. The utensils may be rinsed or not as desired before drying. The compositions are especially useful in cleansing and sanitizing bar glasses where hot washing and sanitizing conditions are not generally available. The process adopted by many regulatory agencies calls for a hand wash in any detergent or soap dishwashing composition followed by a rinse in cold water. This is followed by a dip in the sanitizing composition, and drain-drying at room temperature without a further rinse or wipe. Our compositions are especially suited for this application, particularly when they contain an anionic surfactant. It is apparent that any of a variety of washing techniques can be employed with our compositions, although as indicated, they are especially useful in applications which present particular problems by reason of the need to wash and sanitize cold, and to avoid after-rinsing.

The ingredients of our compositions are blended in any equipment which provides mixing, for example in a paddle mixer, a Hobart Mixer, a Patterson Kelly Twin Shell Blender, or the like, to provide a uniform and homogeneous composition. Preferably the polyphosphate and the urea derivative are blended together, followed by the tetraborate, bisulfate and anionic or nonionic surfactant in that order, with the chlorosiocyanurate being added last. In the case of liquid surfactants, these surfactants should be taken up on the polyphosphate and tetraborate prior the addition of the remaining components as given above.

Our compositions are highly stable on storage, although of course when they are exposed to excessive amounts of moisture, either in hot humid atmospheres or by soaking of the container, the chloroisocyanuate reacts to release available chlorine. Accordingly, it is desirable to store them in containers which have some provision for keeping out excessive moisture, for example in pasteboard cartons with a moisture barrier wrapping or in fiber drums with polyethylene or other water-proof liners.

The following examples are given by way of illustration of this invention only, and are not to be considered as limiting the scope thereof in any way. Where percentages are given in the examples and elsewhere herein, they are in terms of percent by weight of total. The compositions of these examples were prepared by blending the ingredients in a paddle mixer in the order given above until a uniform homogeneous composition results.

TABLE I.—EXAMPLES 1-6 (THIS INVENTION)

| Component | Examples, percent by weight | | | | | |
|---|---|---|---|---|---|---|
| | 1 | 2 | 3 | 4 | 5 | 6 |
| Sodium tetraborate.5H$_2$O | 35.0 | 35.0 | 35.0 | | 35.0 | 32.5 |
| Sodium tetraborate.2H$_2$O | | | | 35.0 | | |
| Sodium tripolyphosphate | 28.32 | 28.82 | 27.5 | 28.82 | 29.73 | 28.48 |
| Sodium bisulfate | 30.0 | 30.0 | 30.0 | 30.0 | 30.0 | 32.5 |
| Urea | 0.68 | 0.68 | | 0.68 | 0.57 | |
| 1,3-dimethyl urea | | | 2.0 | | | 1.82 |
| Sodium dichloroisocyanurate | 5.0 | 5.0 | 5.0 | 5.0 | 4.20 | 4.20 |
| Nonionic surfactant [1] | 1.0 | | | | | |
| Anionic surfactant [2] | | 0.5 | 0.5 | 0.5 | 0.5 | 0.5 |

[1] 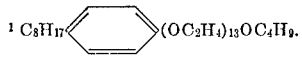 $C_8H_{17}$—⟨⟩—$(OC_2H_4)_{13}OC_4H_9$.

[2] Sodium dodecyl benzene sulfonate (40% active).

TABLE II.—EXAMPLES A-F (COMPARATIVE)

| Component | Examples, percent by weight | | | | | |
|---|---|---|---|---|---|---|
| | A | B | C | D | E | F |
| | Comparison demonstrates | | | | | |
| | Excess urea | Low pH[1] | High pH[2] | No urea compound | No tetraborate | High tetraborate water of hydration |
| Sodium tetraborate.5H$_2$O | 35.0 | 35.0 | 45.0 | 35.0 | | |
| Sodium tetraborate.10H$_2$O | | | | | | 35.0 |
| Sodium sulfate | | | | | 35.0 | |
| Sodium tripolyphosphate | 19.0 | 21.0 | 26.0 | 29.5 | 29.07 | 28.82 |
| Sodium bisulfate | 30.0 | 35.0 | 20.0 | 30.0 | 30.0 | 30.0 |
| Urea | 10.0 | 3.0 | 3.0 | | 0.68 | 0.68 |
| Sodium dichloroisocyanurate | 5.0 | 5.0 | 5.0 | 5.0 | 5.0 | 5.0 |
| Nonionic surfactant [3] | 1.0 | 1.0 | 1.0 | | | |
| Anionic surfactant [4] | | | | 0.5 | 0.50 | 0.5 |

[1] The pH of a ½ oz. per gallon solution of the composition in water was 5.5
[2] The pH of a ½ oz. per gallon solution of the composition in water was 8.5.

[3] 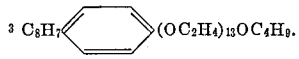 $C_8H_7$—⟨⟩—$(OC_2H_4)_{13}OC_4H_9$.

[4] Sodium dedecyl benzene sulfonate (40% active).

The compositions of Examples 1–6 in Table I were employed to hand-wash dishes, glasses and silverplated and stainless steel cutlery which had been used to serve food and beverages to humans. The washed utensils were permitted to drain dry at room temperature. All of the washed and dried utensils were clean and free of objectionable streaks and films.

Representative compositions of Examples 1 to 6, as well as of Comparative Examples A to F, were also tested for specific properties as reported below.

Chlorine Stability in Solution

The percentage of loss of available chlorine from solutions of representative compositions, after 4 and 8 hours of bath life at 70° F., are given in Table III which follows. The solutions tested were ½ oz. per gal. aqueous solutions of the compositions of Examples 1, 2, 3, A, B and C from Tables I and II. This series of experiments demonstrates the effects of excess urea and of having too high and too low a solution pH.

TABLE III.—CHLORINE SOLUTION STABILITY

| Examples | Solution pH | Urea level | Percent loss of initial available chlorine | |
|---|---|---|---|---|
| | | | 4 hours | 8 hours |
| This invention: | | | | |
| 1 | 7.10 | 0.68 | 16.5 | 23.4 |
| 2 | 6.50 | 0.68 | 15.8 | 24.2 |
| 3 | 7.45 | 0.68 | 0.0 | 0.0 |
| Comparative: | | | | |
| A (Excess urea) | 6.50 | 10.0 | 77.6 | |
| B (Low pH) | 5.50 | 3.0 | 69.1 | |
| C (High pH) | 8.40 | 3.0 | 76.3 | |

Rinsability

For this comparison drinking glasses were soiled with beer, washed with a 0.000625 g./cc. solution of a typical hand dishwashing detergent (20% sodium tripolyphosphate, 10% sodium dodecyl benzene sulfonate (100% active basis) 30% sodium sesquicarbonate, 40% sodium sulfate) rinsed in clean tap water, and sanitized by submerging the glasses for 2 minutes in a ½ oz. per gal. solution of the given exemplified composition at 70° F. The solutions initially contained 120 parts per million available chlorine. Following this procedure the glasses were set out to dry at room temperature (70° F.), and upon drying they presented the appearances described below.

TABLE IV.—RINSABILITY

| Examples | Glass appearance evaluation | |
|---|---|---|
| | Streaking | Filming |
| This invention: | | |
| 1 | None | None. |
| 2 | None | None. |
| Comparative: | | |
| E | Slight (4 of 4) | Moderate (4 of 4): |

Chlorine Odor and Taste

These experiments demonstrate the effectiveness of the herein compositions in suppressing chlorine odor both in the bath and on wet glasses which have been washed with them. The glasses were beer glasses which had been washed, rinsed and then sanitized by submerging the glasses for 2 minutes in a solution of the exemplified composition at 70° F., all as described above under Rinsability. The results given are chlorine ordor in the bath and on the wet glasses, and any chlorine taste in beer served in the glass after it had been permitted to drain to partial dryness.

TABLE V.—CHLORINE ODOR AND TASTE EVALUATION

| Examples | Chlorine odor | | Chlorine taste in beer |
|---|---|---|---|
| | Bath | Wet glasses | |
| This invention: | | | |
| 1 | None | None | None. |
| 2 | None | None | None. |
| Comparative: | | | |
| D | (1) | (1) | (2). |

[1] Objectionably strong.
[2] Strong chlorine (4 of 4).

Beer Foam Control

These experiments demonstrate the effect on beer foam of employing anionic surfactants, as opposed to nonionic surfactants, in our compositions. The compositions of Examples 1, 2 and of Comparative Example C were dissolved in room temperature (70° F.) tap water to provide solutions having available chlorine contents of 120 parts per million. The glasses were then washed, rinsed and then sanitized by submerging the glasses for 2 minutes in a solution of the exemplified composition, all as described above under Rinsability. Beer was then added (1) to wet glasses immediately after santizing and (2) to glasses which had been allowed to dry after sanitizing. The rate of beer head collapse was noted.

The composition of Example 2, which contained anionic surfactant, in both cases provided sanitized glasses in which the rate of beer head collapse was equivalent to that noted in clean glasses which had been wetted only with tap water. On the other hand, the beer head disappeared almost instantly when it was poured into glasses which had been sanitized with the compositions of Examples 1 and C, which contained nonionic surfactant.

Dry Storage Stability

The compositions of Examples 2, 4 and Comparative Example F demonstrate the property of dry storage stability. Percent loss of initial available chlorine after two weeks permeable [1] and two weeks sealed [2] storage are given. The tests demonstrate the deleterious effect of incorporating a sodium tetraborate having 10 molecules of water of hydration as compared with a sodium tetraborate having one to five molecules of water of hydration. The test methods are accelerated tests, and the values shown for Example F employing sodium tetraborate having 10 molecules of water of hydration correlate well with commercially unacceptable storage stabilities, whereas the values for Examples 2 and 4 correlate with commercially acceptable stabilities.

TABLE VI.—DRY STORAGE STABILITY

| Examples | Percent loss of available chlorine | |
|---|---|---|
| | 2 weeks permeable [1] | 2 weeks sealed [2] |
| This invention: | | |
| 2 | 44.5 | 24.0 |
| 4 | 29.8 | 47.0 |
| Comparative: | | |
| F | 67.2 | 62.7 |

[1] Samples in appropriate containers are capped with a piece of 2 mil. polyethylene/paper laminate (moisture permeable), sealed with plastic tape, and stored in a controlled oven at 100±2° F. and 80±5% relative humidity.
[2] Samples in appropriate containers are stoppered with rubber stoppers ealed with plastic tape and stored in an oven as described in ([1]).

Germicidal Effectiveness

Examples 5 and 6 below illustrate the germicidal effectiveness of typical compositions of this invention. This table shows the results of the A.O.A.C. (Available Chlorine Germicidal Equivalent Concentration) Test on *Salmonella typhosa* and *Staphylococcus aureus*. The values shown indicate that the compositions of Examples 5 and 6 are effective sanitizing compositions.

TABLE VII.—GERMICIDAL EFFECTIVENESS

| Examples | P.p.m. of available chlorine from NaOCl at pH 8.5 to which the compositions are gemicidally equivalent[1] | |
|---|---|---|
| | *Salmonella typhosa* | *Staphylococcus aureus* |
| This invention: | | |
| 5[2] | 75 | 75 |
| 6[2] | Above 75, less than 100. | 75 |

[1] The specified examples showed the same absence of bacteria growth in consecutive tubes of subculture media as did the particular concentration of NaOCl control.
[2] These compositions contain in solution 100 p.p.m. (parts per million) of available chlorine.

The above examples, including the Comparative Examples, demonstrate the effectiveness of the compositions of this invention as cleansing and sanitizing agents. They also demonstrate the particular effectiveness of the compositions of this invention incorporating anionic surfactants in the cleansing and sanitizing of bar glasses used for serving beer.

The desirable properties of these compositions are achieved through the co-action of the various ingredients, which have not heretofore been incorporated together into

[1] See footnote 1 to Table VI.
[2] See footnote 2 to Table VI.

compositions of the kind shown herein. Obviously the above examples can be multiplied to show the effectiveness of a variety of compositions within the scope of the following claims.

What is claimed is:

1. A composition for cleansing and sanitizing utensils used for serving foods and beverages, containing as essential ingredients in percentages by weight, 20 to 50% of an alkali metal polyphosphate, 20 to 40% of sodium tetraborate having an $Na_2O$ to $B_2O_3$ ratio of 1:2.25 and having 1 to 5 moles of water of hydration, 20 to 40% of an alkali metal bisulfate, 4 to 6% of a chloroisocyanurate which dissolves on use to provide at least about 100 p.p.m. of available chlorine in the sleansing solution, a urea compound from the group consisting of urea and N–lower alkyl ureas in which the alkyl groups have 1–4 carbon atoms in an amount of 0.5 to 3% to provide an NH to $Cl^+$ ratio of about 1:1 and 0.10 of 2% of an anionic or a nonionic water-soluble chlorine resistant nonsoap synthetic surfactant.

2. The compositions of claim 1 in which the composition contains 25 to 35% of the alkali metal polyphosphate, 25 to 35% of the sodium tetraborate, 25 to 35% of the alkali metal bisulfate, 5% of the chloroisocyanurate, an amount of the urea compound to provide an NH to $Cl^+$ ratio of about 1:1, and 0.1 to 2% by weight of an anionic or nonionic surfactant.

3. The composition of claim 1 in which the alkali metal polyphosphate is sodium tripolyphosphate, the chloroisocyanurate is sodium dichloroisocyanurate or potassium dichloroisocyanurate, and the urea compound is urea.

4. The composition of claim 1 in which the surfactant is an anionic surfactant.

References Cited

UNITED STATES PATENTS 3,503,885   3/1970   Wedell _____ 252—105

MAYER WEINBLATT, Primary Examiner

U.S. Cl. X.R.

252—106, 107, 187; 424—128, 149, 249

UNITED STATES PATENT OFFICE
CERTIFICATE OF CORRECTION

Patent No. 3,554,915          Dated January 12, 1971

Inventor(s) Robert E. Keay and Russell R. Keast

It is certified that error appears in the above-identified patent and that said Letters Patent are hereby corrected as shown below:

Column 7, line 46 "ordor" should read --odor--.

Column 8, Table 6, footnote 2 "ealed" should read --sealed--

Column 8, Table 7, footnote 1 should read --These compositio contain in solution 100 p.p.m. (parts per million) of availa chlorine.--

Column 8, Table 7, footnote 2 should read --The specified examples showed the same absence of bacteria growth in consecutive tubes of subculture media as did the particular concentration of NaOCl control.--

Claim 1, line 14 "sleansing" should read --cleansing--.

Signed and sealed this 15th day of February 1972.

(SEAL)
Attest:

EDWARD M. FLETCHER, JR.        ROBERT GOTTSCHALK
Attesting Officer               Commissioner of Patents